United States Patent
Smith et al.

[11] Patent Number: 5,995,822
[45] Date of Patent: Nov. 30, 1999

[54] METHOD FOR HANDLING PARALLEL TRANSACTIONS ON TELEPHONE PRE-PAID ACCOUNTS

[75] Inventors: Ola Smith, Järfälla; Carl Södrén, Solna; Karl Tage Göran Vincent, Stockholm, all of Sweden

[73] Assignee: Telefonaktiebolaget L M Ericsson, Stockholm, Sweden

[21] Appl. No.: 08/869,280

[22] Filed: Jun. 2, 1997

[51] Int. Cl.[6] .................................................. H04Q 7/20
[52] U.S. Cl. ............................................. 455/406; 455/405
[58] Field of Search .................................. 455/405, 406, 455/407, 408, 416; 379/111, 114

[56] References Cited

U.S. PATENT DOCUMENTS

| | | | |
|---|---|---|---|
| 4,706,275 | 11/1987 | Kamil | 379/144 |
| 4,831,647 | 5/1989 | D'Avello et al. | 379/91 |
| 5,265,155 | 11/1993 | Castro | 379/112 |
| 5,303,297 | 4/1994 | Hillis | 379/63 |
| 5,359,182 | 10/1994 | Schilling | 235/380 |
| 5,450,477 | 9/1995 | Amarant et al. | 379/93 |
| 5,469,497 | 11/1995 | Pierce et al. | 379/115 |
| 5,517,555 | 5/1996 | Amadon et al. | 379/59 |
| 5,559,871 | 9/1996 | Smith | 379/115 |
| 5,583,918 | 12/1996 | Nakagawa | 379/61 |
| 5,592,535 | 1/1997 | Klotz | 379/58 |
| 5,615,408 | 3/1997 | Johnson et al. | 455/410 |
| 5,778,313 | 7/1998 | Fougnies | 455/406 |
| 5,826,185 | 10/1998 | Wise et al. | 455/406 |
| 5,854,975 | 12/1998 | Fougnies et al. | 455/406 |

FOREIGN PATENT DOCUMENTS

| | | | |
|---|---|---|---|
| 0587259A2 | 3/1994 | European Pat. Off. | H04Q 3/00 |
| 4312362 | 4/1993 | Germany | H04B 7/26 |
| 9320644 | 10/1993 | WIPO | H04M 17/00 |
| 9636159 | 11/1996 | WIPO | H04M 3/56 |
| 9701921 | 1/1997 | WIPO | H04M 15/00 |

*Primary Examiner*—Dwayne D. Bost
*Assistant Examiner*—Myron K. Wyche
*Attorney, Agent, or Firm*—Jenkens & Gilchrist, P.C.

[57] ABSTRACT

A method is disclosed such that when a call is being set up from or to a mobile (or fixed) pre-paid subscriber, a portion of the value in the subscriber's pre-paid account is withdrawn to cover the cost of the call. Preferably, the amount withdrawn is large enough to cover the cost for a call of typical duration (e.g., 4 minutes). At call set up, for example, in an Intelligent Network, this amount is withdrawn from the account and allocated to the call being set up. If this amount is not completely used up, the remainder is returned to the pre-paid account. If, however, the allocated amount is depleted before the call is completed, a second allocation or withdrawal from the account is requested for that call. If the value left in the account is large enough to cover the second withdrawal request, a second amount is withdrawn and allocated to cover the ongoing call. If needed, additional withdrawals can be made to cover the ongoing call until it is completed. Once the call is completed, any remainder of the allocated amount is returned to the pre-paid account. Consequently, a pre-paid subscriber can have a plurality of parallel ongoing calls, and because the amount in the pre-paid account is being monitored and accounted for before or while the calls occur, there is no risk that these calls will not be covered by the amount in the pre-paid account.

23 Claims, 4 Drawing Sheets

METHOD FOR HANDLING PARALLEL TRANSACTIONS ON TELEPHONE PRE-PAID ACCOUNTS

BACKGROUND OF THE INVENTION

1. Technical Field of the Invention

The present invention relates in general to the field of telephony accounting and, in particular, to a method for use by telephone system operators to ensure that pre-paid subscribers can pay for simultaneous telephone calls.

2. Description of Related Art

Currently, most mobile telephone subscribers pay for their mobile calls after they receive a monthly bill from their service provider (commonly referred to as "post-paid" accounting). This process of monthly accounting requires a substantial amount of administrative support in order for the service provider to collect the call data, calculate the costs for the calls, send bills to the subscribers, etc. Use of these post-paid accounting systems typically requires the service providers to check into their subscribers' creditability, and ultimately trust the subscribers to pay their bills on time.

The concept of pre-paid accounting has been recently introduced into the mobile telephony market. Generally, the following two mobile pre-paid accounting approaches have been introduced: (1) the Intelligent Network (IN) approach; and (2) the Call Detail Record (CDR) approach.

An Intelligent Network is a mobile network architecture that relocates specific services and databases from switches to one or more network control and decision points. Such a network architecture contains Service Switching Points (SSPs) or switches with bearer and basic service control capabilities, Service Control Points (SCPs) or elements with advanced service control capabilities, and a Service Management System (SMS) that controls the deployment of services and associated service data. A more detailed description of mobile IN architectures is given in "Cellular Radio Systems" by D. M. Balston and R. C. V. Macario, published by Artech House, Inc. (1993).

Using IN technology for pre-paid mobile telephony accounting, a subscription for each pre-paid customer is stored in a subscriber database in a system's IN node. Each subscription field in the IN node contains certain information such as, for example, the number of charging units (to be used for the payment of a call), dates (e.g., when the charging units or subscription will expire, when announcements are to be played, etc.), and other subscriber related information (e.g., tariff class, lists of barred and allowed numbers, and other restrictions and information about subscribers). This subscriber information can be stored in the IN's Service Control Function (SCF), an external database (e.g., a Service Data Function or SDF), or both. The charging units can be any unit value, as long as the unit is fully convertible between monetary value, time value, and meter pulses (described below).

For mobile systems using the CDR approach for pre-paid accounting purposes, the call data records are collected similar to those in conventional billing systems. However, a difference between the post-paid and pre-paid CDR approaches is that the pre-paid CDR approach maintains a dedicated pre-paid account in a database for each mobile subscriber. When a call has been made and a resulting CDR is being processed by the system, the cost of the call is calculated and deducted from the amount in the subscriber's account. If the account reaches zero (or a negative value) the pre-paid system orders the mobile network to bar the subscriber from making additional calls. A dedicated service number to an Interactive Voice Response (IVR) subsystem can be associated with such an accounting system, which a service subscriber can call and request the account's balance (e.g., a bank-by-phone machine).

A CDR accounting system can handle parallel calls (e.g., during multi-party calls, call forwarding, or call holding), because the cost of these calls can be calculated after the calls' completion. However, because of the delay in the delivery of the CDR, there is an obvious risk that the subscribers will run up charges for more calls than their account will cover.

The basic problem that has to be solved is to determine how to control the value of a pre-paid account while calls are ongoing. In an IN solution, pre-paid calls are routed in the network to the Service Switching Function (SSF). The SSF then signals the SCF to inform the SCF about the call. In this signalling message, the SSF sends, for example, the A-number (calling party number), B-number (called party number), location information, and other relevant information to the SCF. The SCF, which recognizes the A-number (B-number) as belonging to an IN subscriber, determines whether the calling party (called party) subscriber is allowed to make (receive) that call (considering the pre-paid account's value). This determination can be made in the SCF after retrieving the charging unit information, and expiration and subscription dates, etc.

If the SCF determines that the call can be allowed, the SCF sends the number of remaining charging units in the account to the SSF to be used for charging of the call, and the call is connected. When the called party answers the call, the SSF starts counting meter pulses (with each meter pulse equal to one charging unit).

If the call is disconnected before all of the charging units in the account are used up, the number of charging units used for that call is transferred back to the SCF, which deducts that amount from the amount in the account. On the other hand, if the call's duration is long enough so that the number of meter pulses counted in the SSF equals the number of charging units that were transferred from the SCF, then the call is disconnected and the account value is set to zero.

A big problem with the existing pre-paid approaches is that when a call is to be set up, all of the value of the account is made available to cover the cost of that call. During the call, this value is depleted continuously, but there is no practical way to view this depletion in real-time. Using an existing IN technology approach, the node where the pre-paid account is stored will not know how many charging units have been used, until the call has been completed and the number to be deducted from the account has been transferred from the SSF. Consequently, during the call, the value of the account reflects a value which is larger than the actual remaining value. If another call is set up at this time, a value larger than the actual value will be made available for this call.

For example, if a pre-paid subscriber sets up a call, the number of charging units remaining in the subscriber's account (e.g., 100) will be copied to the SSF. The SSF sets up the call and starts the process of counting meter pulses. If, however, during this ongoing call, the subscriber desires to set up another call (e.g., a conference call), the system's multi-party service function is used to set up the call. Since the exact value in the account is not known outside the process in the SSF associated with the original call, the only value known is the original value (100) which is still stored in the SCF. This original value is copied a second time to the SSF to start a new process in the SSF associated with the new call. Unfortunately, unless conference calls are not allowed, this recopying of the original value can be repeated as many times as there are connections (x) to be made in the conference call. Therefore, every connection (x) made in the conference call can deplete the original (100) charging units. In this example, the pre-paid subscriber will thus be able to call for x*100 charging units, although the pre-paid account only had 100 charging units to start with.

The same problem occurs if a pre-paid subscriber uses call forwarding, since the multiple call processes involved can be simultaneously depleting the original charging units in the account. For example, with the service called "Call Forwarding on Busy" (CFB) this double-charging can occur each time the subscriber is involved in a call and another party makes an incoming call. Also, if the pre-paid subscriber uses Call Forwarding Unconditional (CFU), Call Forwarding on Not Reachable (CFNRc), or Call Forwarding on No Reply (CFNRy), the same double-charging problem can arise if there is an ongoing forwarded call and the subscriber makes an outgoing call. The same problem can occur if the pre-paid subscriber uses the Call Hold function, makes two outgoing calls, and then toggles between them.

Another situation where parallel transactions and double-charging can occur, is when a recurring subscription fee or other type of payment is made to an external system (e.g., billing system, bank, credit card service provider, etc.) and deducted from the pre-paid account. If a call is ongoing while the payment is being made, the system will not know whether the amount to be deducted will be covered or not, until the ongoing call is completed.

SUMMARY OF THE INVENTION

It is, therefore, an object of the present invention to eliminate the risk for a service provider that the cost for parallel calls will not be covered by the amount in a telephone subscriber's pre-paid account.

It is another object of the present invention to process parallel pre-paid mobile telephone account transactions that are discrete and instantaneous.

It is yet another object of the present invention to process parallel, non-interfering pre-paid mobile telephone account transactions.

It is also an object of the present invention to enable supplementary mobile telephone services, such as Call Forwarding or conference calls, to be handled securely for pre-paid accounts.

It is another object of the present invention to make pre-paid mobile telephone services as attractive to service providers and subscribers as post-paid telephone services.

In accordance with the present invention, the foregoing and other objects are achieved by a method in which when a call is being set up from or to a pre-paid subscriber, a portion of the value in the subscriber's pre-paid account is withdrawn to cover the cost of the call. Preferably, the amount withdrawn is large enough to cover the cost for a call of typical duration (e.g., 4 minutes). At call set up, this amount is withdrawn from the account and allocated to the call being set up. If this amount is not completely used up, the remainder is returned to the pre-paid account. If, however, the allocated amount is depleted before the call is completed, a second allocation or withdrawal from the account is requested for that call. If the value left in the account is large enough to cover the second withdrawal request, a second amount is withdrawn and allocated to cover the ongoing call. If needed, additional withdrawals can be made to cover the ongoing call until it is completed. Once the call is completed, any remainder of the allocated amount is returned to the pre-paid account. Consequently, if a parallel transaction takes place, the account value made available for this transaction is less than or equal to the actual current account value, and the risk is eliminated that the costs for parallel calls will not be covered by the subscriber's pre-paid account.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
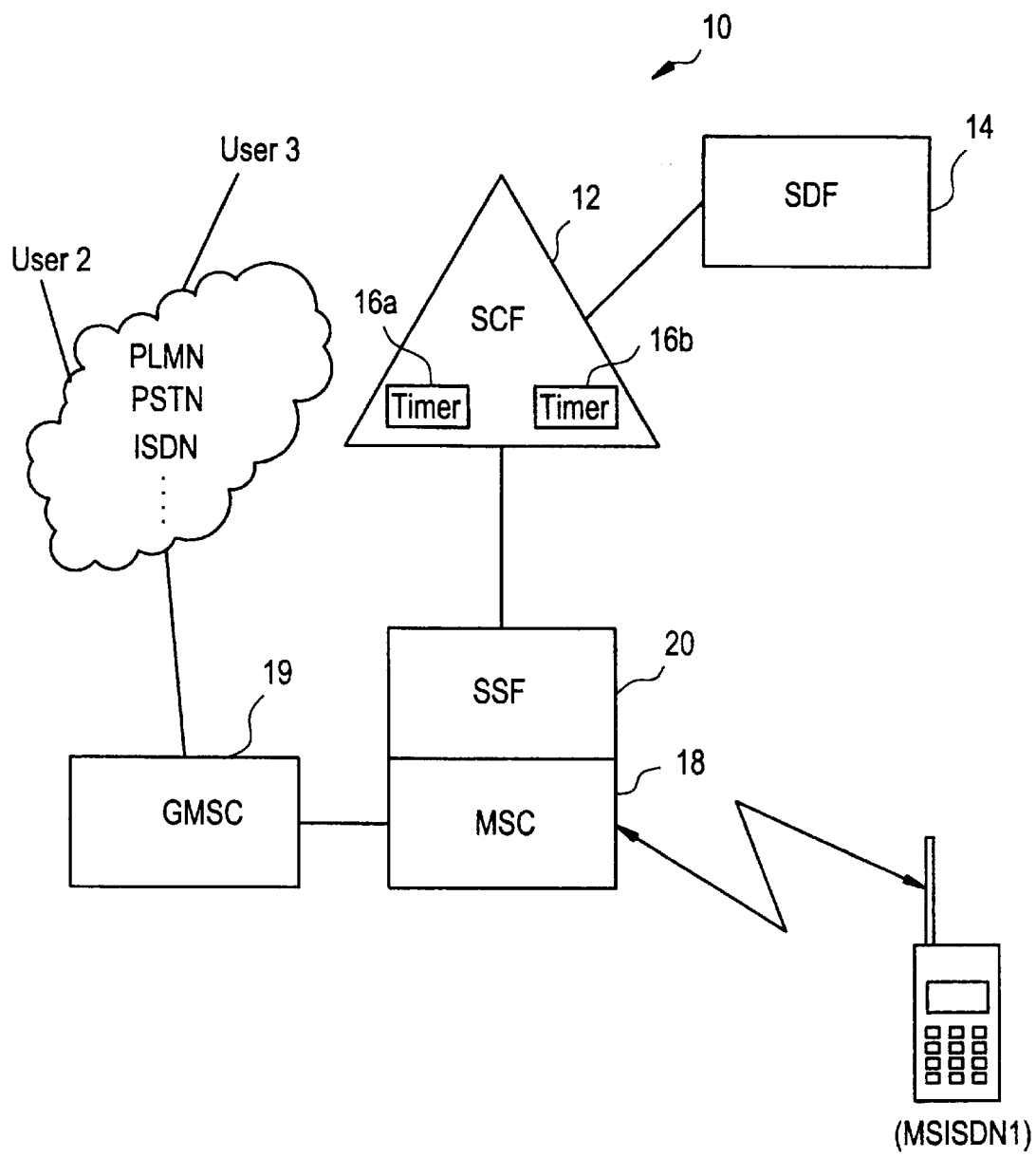
FIG. 1 is a block diagram of a system that can be used to implement the preferred embodiment of the present invention.
Figure 2A:
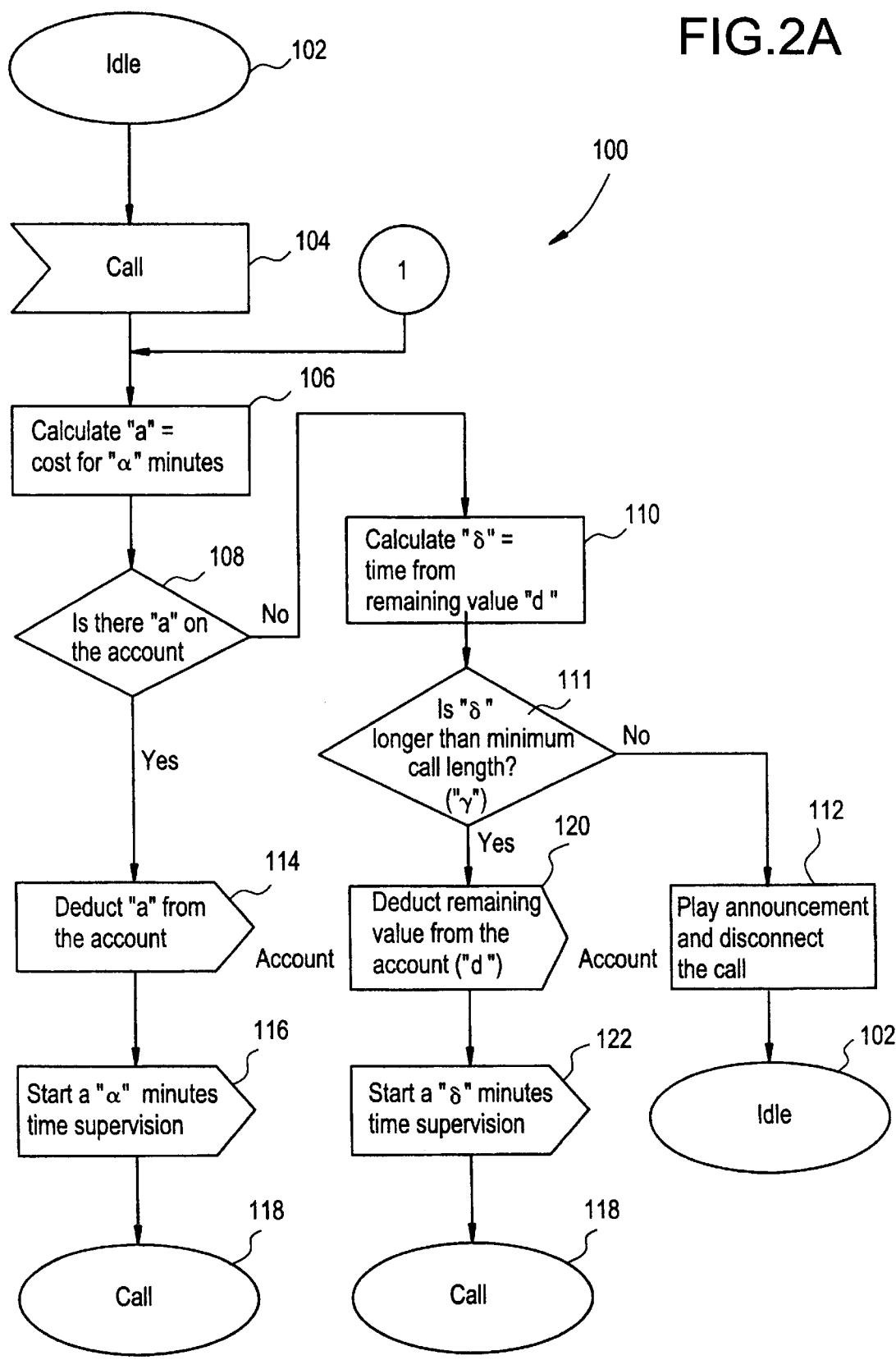
FIGS. 2A and 2B are flow diagrams of a method that can be used to implement the present invention.
Figure 2B:
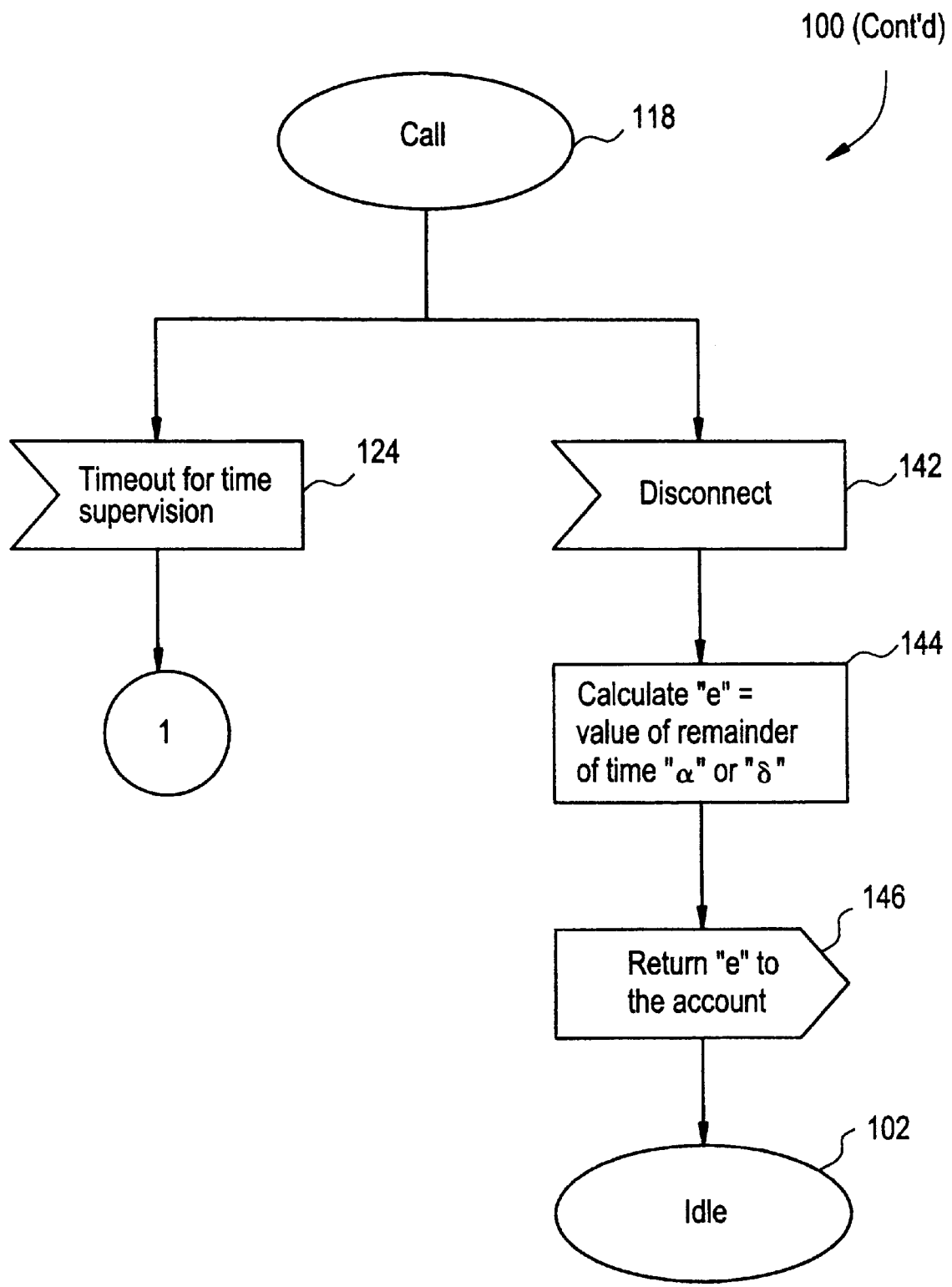
Figure 3:
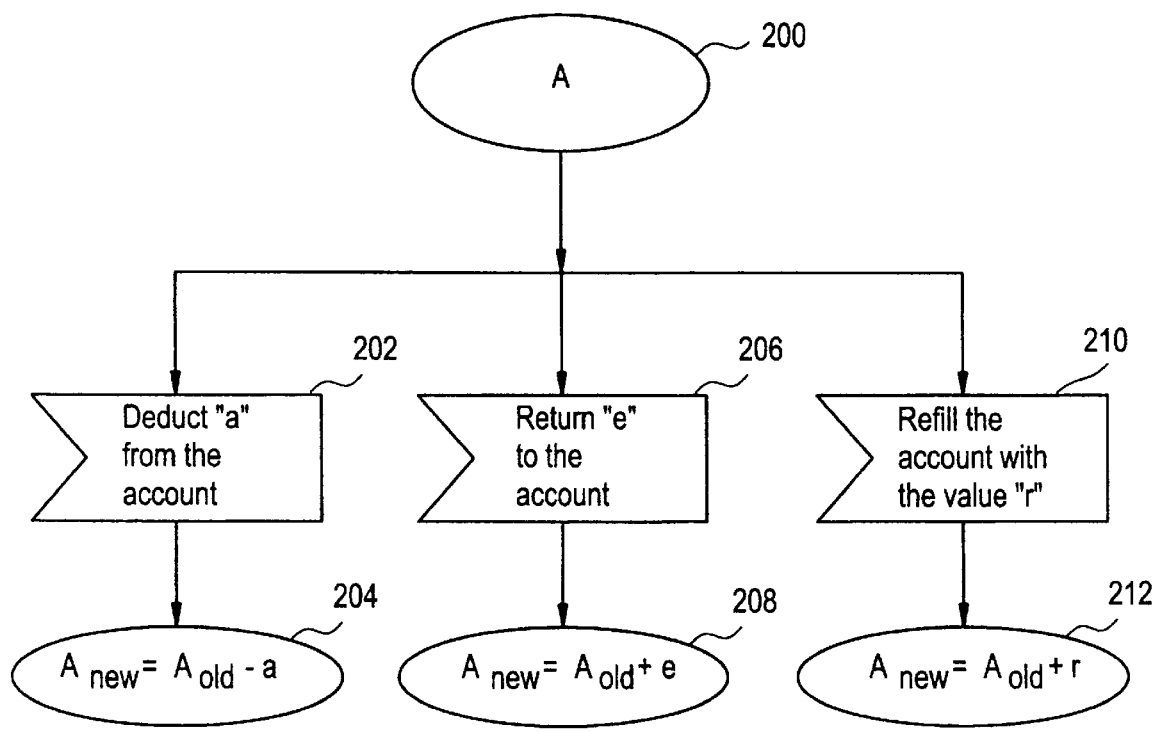
FIG. 3 is a simplified flow diagram of an exemplary accounting process, which can be implemented in accordance with the preferred embodiment and the method and system of FIGS. 1 and 2.

The preferred embodiment of the present invention and its advantages are best understood by referring to FIGS. 1–3 of the drawings, like numerals being used for like and corresponding parts of the various drawings.

Essentially, in accordance with the present invention, when a mobile call is being set up from or to a mobile prepaid subscriber, a portion of the value in the subscriber's pre-paid account is withdrawn to cover the cost of the call. Preferably, the amount withdrawn is large enough to cover the cost for a call of typical duration. In a preferred embodiment of the present invention, a call is being set up from or to a subscriber in an Intelligent Network, and the initial amount is withdrawn from the subscriber's pre-paid account. The pre-paid account information can, for example, be stored in a Service Control Function. Alternatively, this information can be stored in an external node, such as, for example, a Service Data Function or billing system database. The withdrawn amount is allocated for the call being set up. If this amount is not completely used up (e.g., a short call), the remainder is returned to the pre-paid account. If, however, the allocated amount is depleted before the call is completed, a second allocation or withdrawal from the account is requested for that call. If the value left in the account is large enough to cover the second withdrawal request, a second amount is withdrawn and allocated to cover the ongoing call. If needed, additional withdrawals can be made to cover the ongoing call until it is completed. Once the call is completed, any remainder of the allocated amount is returned to the pre-paid account. Consequently, in accordance with the invention, since the value of the pre-paid account always reflects a value that is less than or equal to the actual current value, a pre-paid subscriber can have a plurality of parallel (simultaneous) calls or other transactions ongoing, with no risk that these calls will not be covered by the amount in the pre-paid account. Notably, this concept can be applied for pre-paid accounts that are used for the payment of any goods or services, such as, for example, electricity, natural gas, water or gasoline.

FIG. 1 is a block diagram of a system that can be used to implement the preferred embodiment of the present invention. For this exemplary embodiment, an Intelligent Network architecture is used to implement the preferred method of the invention, but this description is for illustrative purposes only and not intended as a limitation on the invention. For example, any appropriate communications network architecture can be used to implement the invention, as long as pre-paid subscriber accounts are involved.

Specifically, referring to FIG. 1, an exemplary IN 10 is disclosed, which includes at least one SCP and at least one SSP (both not explicitly shown). The IN includes at least one SCF 12, which contains service logic that controls the implementation of the IN services, and at least one SDF 14, which provides access to the service-related data. The SDF 14 can be used as a database to store the subscribers' pre-paid accounts information, or the account information can be stored in another external node (e.g., a billing system database), or in the SCF. In this exemplary embodiment, the subscriber's pre-paid account information is stored in the SDF. The SCF 12 and SDF 14 are coupled together for two-way communications and the transfer of service data therebetween. SCF 12 includes one or more timers 16, each of which can be used to measure the duration of a call. In another embodiment, the timer function could be located in, for example, the SSF.

One or more mobile subscribers (e.g., identified by a unique Mobile Station Integrated Services Digital Network Number or MSISDN) can access IN 10 via a mobile services switching center (MSC) 18 through a radio air interface. Other telephony users (e.g., fixed or mobile telephone user2 or user3) can access IN 10 from one or more of a number of other communications networks (e.g., PSTN, ISDN, PLMN, etc.). Each MSC 18 is connected to an SSF 20 included in the SSP. The SSF 20 recognizes those calls requiring IN services, and interacts with the call processing and service logic to provide the services required.

FIGS. 2A and 2B are flow diagrams of a method (100) that can be used to implement the present invention. In the preferred embodiment, the method shown in FIGS. 2A and 2B can be implemented in the system shown in FIG. 1, but the invention is not intended to be so limited. The preferred method can be implemented in any appropriate mobile or wire-bound communications system, as long as pre-paid subscriber accounts are involved.

Referring to FIGS. 1 and 2A, at step 102, the system is waiting for a call set up request to be made (e.g., for an incoming or outgoing call). The type of call being set up is not intended as a limitation on the present invention, and can include voice and/or videoconferencing telephone calls, facsimile calls, calls to transfer data, etc. At step 104, in this example, a pre-paid account subscriber "MSISDN1" (e.g., a mobile subscriber) attempts to make a call. In response to a call control set up message from MSISDN1's mobile phone, MSC 18 interrogates a Visitor Location Register or VLR (not explicitly shown) and determines, based on the information provided in the call set up message, that this subscriber is a subscriber to an IN service. The call request is then routed to SSF 20, which in turn communicates with SCF 12 using a standard protocol. The SCF identifies the subscriber as a pre-paid subscriber. Among the information transferred from the SSF 20 to the SCF 12 is the calling party (A) number and the called party (B) number. In this example, pre-paid subscriber MSISDN1 is attempting to call another subscriber (e.g., user2). Each of the subscribers (MSISDN1, user2, user3) shown in the exemplary embodiment of FIG. 1 can be pre-paid subscribers for the services of IN 10, but as illustrated, the present invention is not intended to be so limited. For example, each of the subscribers user2 and user3 can be pre-paid or post-paid subscribers to a Public Switched Telephone Network (PSTN), Public or Private Data Network, ISDN, or one or more Public Land Mobile Networks (PLMNs) that do not include IN 10.

At step 106, SCF 12 calculates an amount "a" that represents a call of predetermined duration "α" minutes (e.g., 4 minutes in the preferred embodiment). At step 108, SCF 12 accesses the pre-paid account information for the calling subscriber MSISDN1 stored in SDF 14 to determine if there is a value in that account which is large enough for the call to be started (e.g., an amount greater than or equal to "a"). If, at step 108, the value in that account is less than the value amount "a", then at step 110, SCF 12 calculates the amount of calling duration "δ" that corresponds to the value remaining in the pre-paid account. At step 111, SCF 12 determines whether the calling duration "δ" calculated at step 110 is at least greater than or equal to a predetermined minimum call duration "γ" (e.g., 30 seconds in the preferred embodiment). If not, at step 112, SCF 12 orders the SSF 20 to send an "announcement" message to the calling subscriber (MSISDN1 in this case), which informs that subscriber that the cost of the call is not covered by the pre-paid account, and the call set up attempt is disconnected.

However, if at step 108, the value in that account is greater than or equal to the value "a" corresponding to the predetermined duration ("α") of a call (e.g., 4 minutes, considering the B-number dialed, time of day or date, etc.), at step 114, the SCF (12) deducts this corresponding value in that account from the SDF database. In this example, as mentioned above, the portion deducted is the amount "a" that represents a call of predetermined duration "α" minutes. Alternatively, in another embodiment, the portion deducted could be any predetermined threshold value amount (i.e., the way the portion is deducted and how its amount is selected is not intended as a limitation on the invention). Assuming there are "A" units of value in the account at step 108, then after the deduction "a", there are now "A-a" units of value left in the account, which can be used for a second call (or other transaction) that can occur in parallel or simultaneously with the original call. Preferably, at step 116, a timer 16a in the SCP (not explicitly shown) is started to keep track of the "α" minutes that have been allocated to the call. Alternatively, the amount of time represented by the value "a" can be converted to a number of pulses and transferred to the SSF 20. Using a known pulse metering approach in the SSF, the number representing the value "a" can be compared with the number of pulses counted during the duration of the call. At step 118, the SSF 20 then sets up and connects the call to the called party.

Returning to step 111, if the SCF 12 determines that the calling duration "δ" calculated at step 110 is at least greater than or equal to the predetermined minimum call duration "γ", then at step 120, the remaining value "d" of the account is deducted from the account. At step 122, the timer 16a in the SCF is started to keep track of the call duration "δ" corresponding to this remaining value. At step 118, the SSF 20 then sets up and connects the call to the called party.

At step 142 of FIG. 2B, if a call that was set up at step 118 is disconnected (e.g., by one of the two parties hanging up) before the time duration "α" or "δ" allocated to the call has passed, at step 144, the SCF calculates an amount "e" that represents the value of the remainder of time duration "α" or "δ". At step 146, the SCF transfers and adds the amount "e" corresponding to the remainder of the time left from "α" or "δ" back to the value remaining in the subscriber's (MSISDN1's) pre-paid account in the SDF 14. At step 102, the system returns to an "idle" state to await another call.

On the other hand, at step 124, if the call is continued until the timer 16a times out (depletes the allotted amount "a" or the account value reaches "zero"), then the method proceeds back to step 106 in FIG. 2A to be repeated. If the method proceeds back to step 106 and is repeated, assuming that the value "A" was the original amount in the account, there would be "A−a" units of value left in the account the first time step 114 is completed, then after the deduction of another "a" units the second time step 114 is completed, there would be "A−2a" units of value left in the account (and so on). As such, the value remaining in the account ("A−a", "A−2a", . . . "A−na", or "zero" if reused) during the iterations could still be used for another call (or other transaction) that could occur in parallel or simultaneously with the original call.

If the pre-paid subscriber MSISDN1 decides to initiate another call while the first call is still ongoing (parallel transaction), another procedure using the same method as shown in FIGS. 2A and 2B is started at step 104 in FIG. 2A while the first call (already using the method shown in FIGS. 2A and 2B) is still ongoing. Notably, this capability of monitoring a subscriber's pre-paid account while parallel transactions are occurring with respect to that account is an important aspect of the present invention.

For example, if the pre-paid subscriber MSISDN1 decides to initiate a multi-party call during the ongoing call, then the SSF 20 notifies the SCF 12 about this request in a second call set up message. At step 106 (for the second call request), the SCF 12 accesses the subscriber's (e.g., MSISDN1's) pre-paid account information in the SDF 14 to determine whether an amount "b" corresponding to a predetermined duration of time "β" can be deducted to cover the cost of the second call. In most cases, "α" and "β" are identical, but this is not necessarily so. The value in the pre-paid account that is available for this procedure is the value left from the first call (e.g., "A−a", "A−2a", . . . , or "zero" if reused). The steps in FIG. 2 (e.g., 108 or 110, etc.) are then followed in parallel with the steps being followed (in FIG. 2) for the original ongoing call. If, at step 114, the pre-paid account value amount is large enough to cover the amount "b" to be deducted for the second call, the second timer 16b in the SCF can be started to measure the time for the second call (step 116), and so on. Notably, this same parallel transaction method can be used, for example, if the pre-paid subscriber MSISDN1 places the ongoing call on "hold" and initiates a call with a third subscriber, or initiates some other parallel call or transaction (e.g., call forwarding, operator-determined transactions, etc.). As such, the present method eliminates the risk to the service provider that these parallel calls or transactions will not be covered by the amount in the subscriber's pre-paid account.

FIG. 3 is a simplified flow diagram of an exemplary accounting process (provided to illustrate this process), which can be implemented in accordance with the preferred embodiment and the method and system of FIGS. 1 and 2. Essentially, for this embodiment, all transaction processes associated with a pre-paid subscriber's account can communicate with the account, and the transactions are discrete and occur instantaneously. The account "remembers" only its current value, and does not keep track of its history. For example, referring to FIG. 3, the pre-paid account can have an initial value "A" (step 200). At step 202, the value "A" can be affected by a deduction (or withdrawal) of an amount "a", for example, when a first call (or similar transaction) is set up. At that point (step 204), the new value in the account is: "$A_{new}=A_{old}-a$". (As used herein, "$A_{old}$" refers to the value of the account at a particular point in time, but this is for illustrative purposes only.) However, during that process, a second call (or similar transaction) can be set up in parallel with the first call, and, for example, an amount "b" deducted for the second call from the value in the account. So, the new value in the account is now: "$A_{new}=A_{old}-a-b$".

Also, during that call set up and withdrawal process, other account transaction processes can occur. For example, at step 206, if a call is terminated prematurely so that a refund to the account is warranted, a refund amount "e" can be added back to the account. At this point (step 208), the new value in the account can be: "$A_{new}=A_{old}+e$", "$A_{new}=A_{old}-a+e$", or $A_{new}=A_{old}-a-b+e$" depending on the timing of the transaction that warranted the refund.

Additionally, during the above-described processes, yet another account transaction can occur. For example, at step 210, if the account value is replenished while the other processes are ongoing, an amount "r" can be added to the account. At this point (step 212), the new value in the account can be: "$A_{new}=A_{old}+r$", $A_{new}=A_{old}+e+r$", "$A_{new}=A_{old}-a+e+r$", or $A_{new}=A_{old}-a-b+e+r$" depending on the timing of the replenishment transaction.

Another exemplary process that can occur is where the original call is placed on "hold" while the pre-paid subscriber makes a short call and then returns to the original call. As such, the value in the account can be represented, for example, by the series: "A", "A−a", "A−a−b", "A−a−b+e", "A−2a−b+e", . . . , which illustrates the value in the account at different times. (This is for illustrative purposes only, where "a" is the cost for a predetermined duration for the first call, "b" is the cost for a predetermined duration for the second call, and "e" is the refund amount added back to the account.)

The present invention can also cover the use of pre-paid calling cards in a fixed network. For example, referring to commonly-assigned U.S. Pat. No. 4,706,275, a typical pre-paid procedure used in fixed networks is to call a free-phone access number (e.g., 1-800-PREPAID). On request from the network, the caller enters (keys in) the calling card number. If the network authorizes the call, the calling party enters (keys in) the B (called) party number. Once the call is connected, the value in the calling card account is depleted, similar to the procedure used for a mobile phone. The problem encountered with using pre-paid calling cards with existing fixed networks is that while one fixed network call is in progress, the calling card account has to be blocked from use for other calls. Consequently, if two or more persons share a pre-paid calling card account, only one of those persons can make a call at any one time (and use the calling card), while the other person(s) has to wait until the ongoing call is over. However, by substituting a fixed network pre-paid calling card account for the mobile pre-paid account described above with respect to FIGS. 1, 2A and 2B, and 3, the method of the present invention can be used to allow these pre-paid calling card calls to occur in parallel while eliminating the risk of overcharges to the fixed service provider.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for use in handling at least two transactions in parallel using a telephone subscriber's pre-paid account, said method comprising the steps of:

responsive to receipt of a first transaction request associated with the subscriber's prepaid account, withdrawing a first portion of a value in the subscriber's pre-paid account;

processing a first transaction in response to said first transaction request;

responsive to receipt of a second transaction request associated with the subscriber's pre-paid account, withdrawing from the subscriber's pre-paid account a second portion of said value already depleted by all or some of said first portion; and processing, in parallel with said first transaction, a second transaction in response to said second transaction request if said value depleted by all or some of said first portion and depleted by said second portion exceeds a minimum value.

2. The method according to claim 1, wherein said telephone subscriber's pre-paid account comprises a mobile radiotelephone subscriber's pre-paid account.

3. The method according to claim 1, wherein said first transaction is associated with an outgoing telephone call.

4. The method according to claim 1, wherein said second transaction is associated with an outgoing telephone call.

5. The method according to claim 1, wherein said second transaction is associated with an incoming telephone call.

6. The method according to claim 1, wherein said first transaction is associated with an incoming telephone call.

7. The method according to claim 1, wherein said first portion of said value represents a cost for said first transaction having a predetermined duration.

8. The method according to claim 1, wherein said pre-paid account is stored in a database in an Intelligent Network Service Control Point.

9. The method according to claim 1, wherein a remainder value is returned to said pre-paid account when at least one transaction of said first transaction and said second transaction is completed.

10. A method for use in handling parallel transactions on a mobile radiotelephone subscriber's pre-paid account, comprising the steps of:

initiating a call associated with said pre-paid account;

calculating a cost for a call of a first predetermined duration;

determining if said cost for a call of a first predetermined duration is less than or equal to an amount in said pre-paid account;

if said cost for a call of a first predetermined duration is less than or equal to said amount in said pre-paid account, deducting said cost for a call of a first predetermined duration from said amount in said pre-paid account, allocating said cost for a call of a first predetermined duration to said call associated with said pre-paid account, and connecting said call associated with said pre-paid account for said first predetermined duration;

if said cost for a call of a first predetermined duration is greater than said amount in said pre-paid account, determining if said amount is greater than or equal to a cost for a call of a second predetermined duration;

if said amount is greater than or equal to said cost for a call of a second predetermined duration, but less than said cost for a call of a first predetermined duration, allocating said amount to said call associated with said pre-paid account, and connecting said call associated with said pre-paid account for a duration associated with said amount;

if said amount is less than said cost for a call of a second predetermined duration, terminating said call associated with said pre-paid account;

in parallel with said call associated with said pre-paid account, initiating a second call associated with said pre-paid account; and proceeding to said step of calculating said cost for a call of a first predetermined duration.

11. The method according to claim 10, further comprising the step of returning to said step of calculating a cost for a call of a first predetermined duration.

12. A method for eliminating a service provider's risk that costs for a first transaction and a second transaction occurring in parallel are not covered by a telephone subscriber's pre-paid calling card account, said method comprising the steps of:

calling an access number;

entering a calling card account number;

requesting set up of a first transaction;

deducting a first portion of a value from said pre-paid calling card account;

connecting said first transaction;

requesting set up of a second transaction;

deducting from said pre-paid calling card account a second portion of said value already depleted by all or some of said first portion; and connecting said second call if said value depleted by all or some of said first portion and depleted by said second portion exceeds a minimum value.

13. A system for use in handling at least two transactions in parallel using a telephone subscriber's pre-paid account, comprising:

a database for storing the subscriber's pre-paid account;

means, responsive to receipt of a first transaction request associated with the subscriber's pre-paid account, for deducting a first portion of a value in the subscriber's pre-paid account;

means for processing a first transaction in response to said first transaction request, said first portion allocated to said processing of said first transaction;

means, responsive to receipt of a second transaction request associated with the subscriber's pre-paid account, for deducting from said subscriber's pre-paid account a second portion of said value already depleted by all or some of said first portion; and means for processing, in parallel with said first transaction, a second transaction in response to said second transaction request if said value depleted by all or some of said first portion and depleted by said second portion exceeds a minimum value.

14. The system according to claim 13, wherein said telephone subscriber's pre-paid account comprises a mobile radiotelephone subscriber's pre-paid account.

15. The system according to claim 13, wherein said first transaction is associated with an outgoing telephone call.

16. The system according to claim 13, wherein said second transaction is associated with an outgoing telephone call.

17. The system according to claim 13, wherein said second transaction is associated with an incoming telephone call.

18. The system according to claim 13, wherein said first portion of said value represents a cost for said first transaction having a predetermined duration.

19. The system according to claim 13, wherein each of said first portion and said second portion of said value represents a cost for a call of predetermined duration.

20. The system according to claim 13, wherein said database comprises an Intelligent Network Service Data Function.

21. The system according to claim 13, wherein a remainder value is returned to said pre-paid account when at least one transaction of said first transaction and said second transaction is completed.

22. The method according to claim 1, wherein said first transaction or said second transaction is associated with a transaction used for payment of calls, goods or services.

23. The system according to claim 13, wherein said first call or said second call is associated with a transaction used for payment of calls, goods or services.

* * * * *

UNITED STATES PATENT AND TRADEMARK OFFICE
CERTIFICATE OF CORRECTION

PATENT NO. : 5,995,822
DATED : November 30, 1999
INVENTOR(S) : Smith et al.

It is certified that error appears in the above-identified patent and that said Letters Patent is hereby corrected as shown below:

Title page,
Item [73], Assignee, after "Ericsson" insert -- (publ) --

Column 1,
Line 48, replace "subscriber related" with -- subscriber-related --
Line 66, after "negative value)" insert -- , --

Column 3,
Line 14, after "(CFB)" insert -- , --

Column 4,
Line 34, replace "prepaid" with -- pre-paid --

Column 9,
Line 6, replace "prepaid" with -- pre-paid --

Signed and Sealed this

Nineteenth Day of February, 2002

Attest:

JAMES E. ROGAN
Attesting Officer        Director of the United States Patent and Trademark Office